March 25, 1969 V. RASO ET AL 3,434,366
MODULAR DRIVE AND GEAR REDUCTION UNIT
Filed May 29, 1967 Sheet 1 of 3

INVENTORS.
VITO RASO
ARLIN C. EISENHART
BY Flan and Flan
ATTORNEYS.

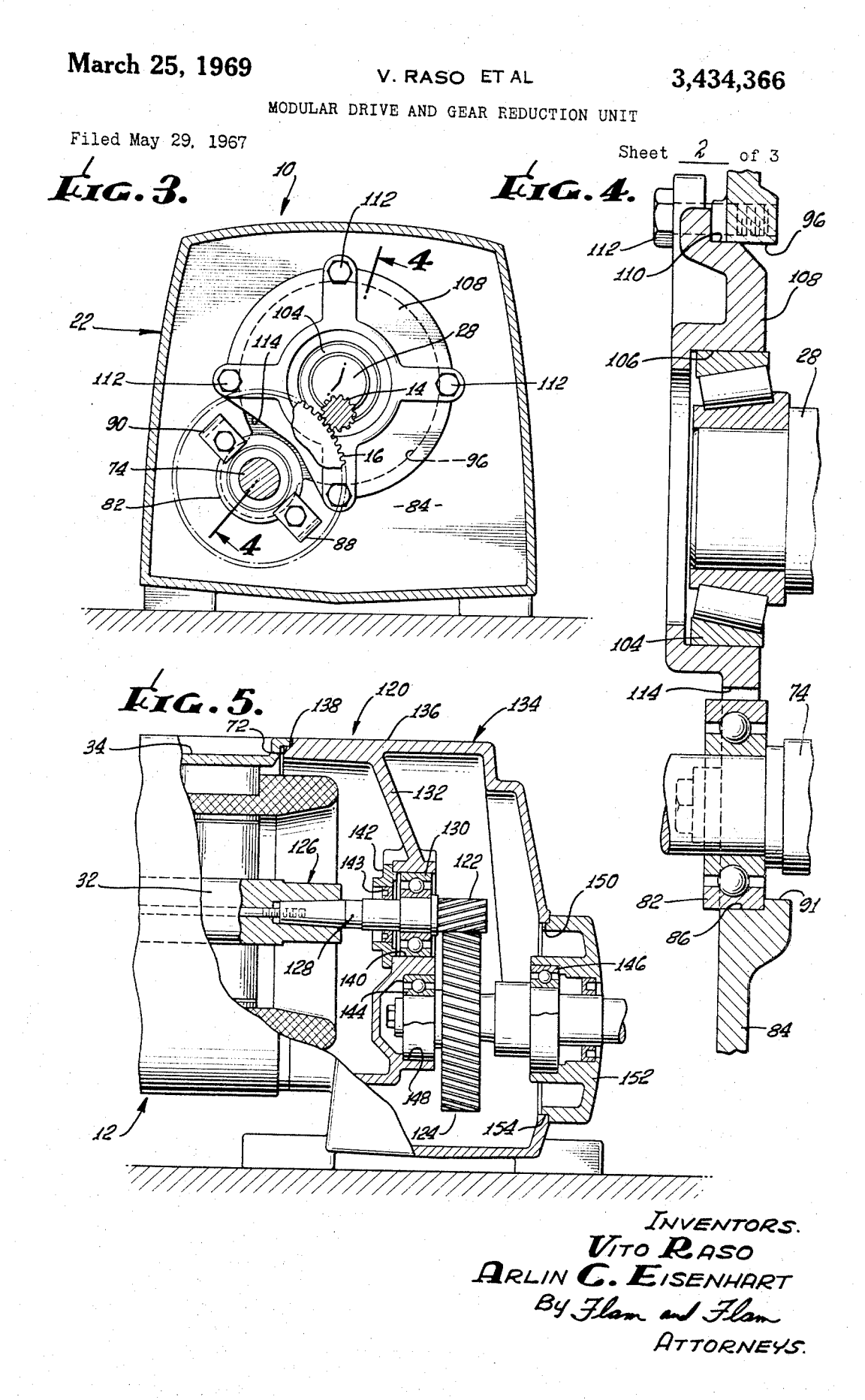

March 25, 1969 V. RASO ET AL 3,434,366
MODULAR DRIVE AND GEAR REDUCTION UNIT
Filed May 29, 1967 Sheet 3 of 3
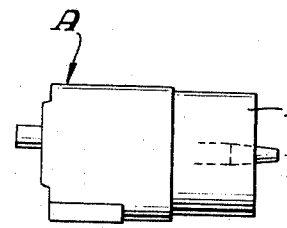
FIG. 6.
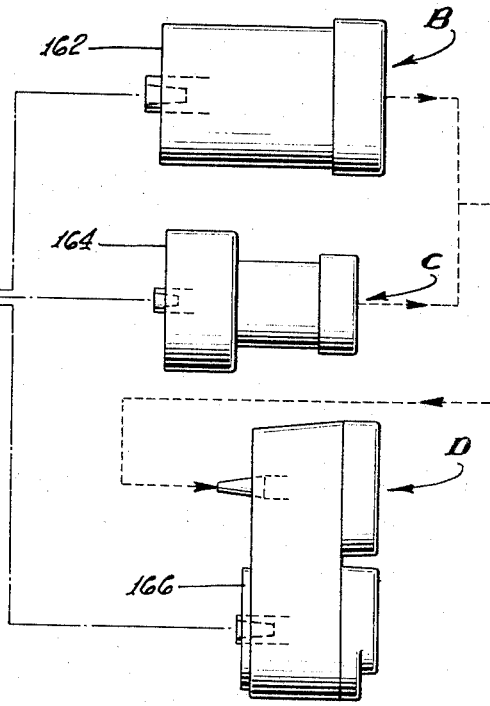
FIG. 7.
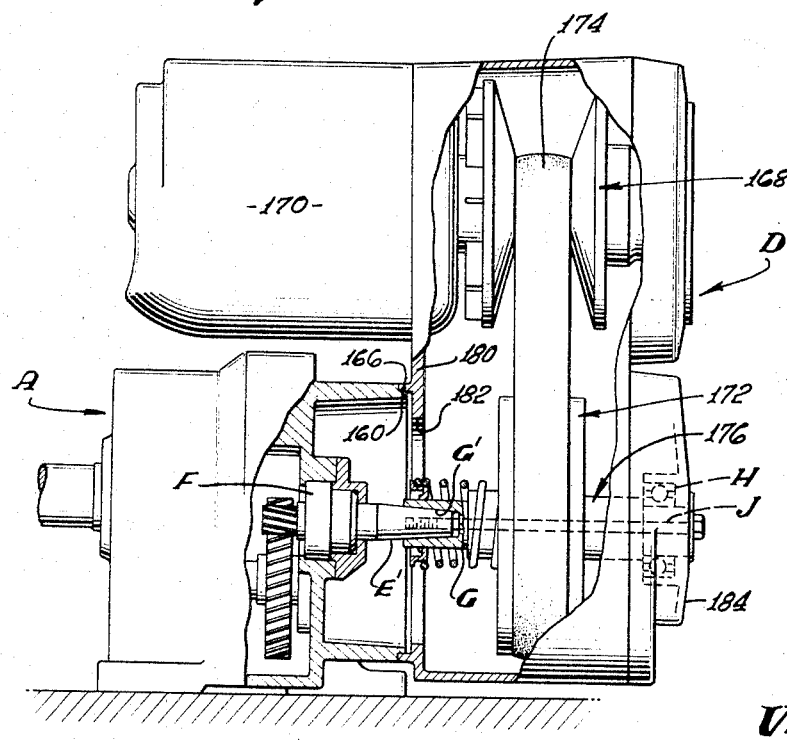
INVENTORS.
VITO RASO
ARLIN C. EISENHART
By Flam and Flam
ATTORNEYS.

United States Patent Office 3,434,366
Patented Mar. 25, 1969

3,434,366
MODULAR DRIVE AND GEAR REDUCTION UNIT
Vito Raso, Buena Park, and Arlin C. Eisenhart, Fullerton, Calif., assignors to Emerson Electric Co., St. Louis, Mo., a corporation of Missouri
Filed May 29, 1967, Ser. No. 641,971
Int. Cl. F16h 1/20
U.S. Cl. 74—421                    11 Claims

ABSTRACT OF THE DISCLOSURE

Various drive modules and various transmission modules are adapted to be connected together interchangeably. The modules each have frames open at one end and bearing walls at the other. Registers at the frame openings align the bearings, and shaft components of the respective modules are connected together by a projection and socket arrangement. The shaft is supported only when the modules are connected together.

BACKGROUND OF THE INVENTION

The present invention relates to power mechanisms including drives and gear reduction units, and also to the problem of stocking suitable components whereby diverse power and speed ratio specifications of customers are met. Heretofore, it has been common to stock various gear and shaft units for incorporation in drives in which the gears might be identical but the shafts of different size according to the power of the drive. These and other components then would be assembled to the customer's order. Time delays are involved since the assembly involves a number of steps. There are, of course, inventory problems. An alternate approach is to stock complete drive units and complete gear reduction units capable of connection through conventional shaft coupling devices. While this may save time in filling an order, it is quite costly since the drive shaft and the input shaft to the gear reduction unit each have a pair of bearings, whereas in theory only two bearings should be required. Moreover, shaft alignment problems are present; the resulting unit ordinarily occupies a good deal more space than would otherwise be required with an integrated drive and gear reduction unit.

The primary object of this invention is simultaneously to overcome both the inventory, time delay and cost problems above noted. In order to accomplish those results, we provide a rigid shaft that serves both as the output shaft of the drive and the input shaft of the gear reduction mechanism wherein the shaft is made of axially separable parts respectively stocked with the drive module and the gear reduction module. The shaft parts having mating conical ends of standard taper whereby shaft parts of different diameters can be coupled, thus reducing the requisite inventory. The shaft parts are drawn together by a draw screw conveniently extending through a bore in the drive shaft part. Accordingly, essentially all that is needed for assembly of a mechanism according to customer specifications of power and speed ratio is to select the appropriate modules, register and secure their housings together, and finally, connect the shaft parts together by the aid of the draw screw.

It is often desirable to provide a gear reduction mechanism having an integral bearing bracket at the output end in order to provide the most secure shaft support. In this instance, the gear elements will be assembled from the input end of the gear reduction mechanism. In a multiple stage gear reduction mechanism, an intermediate bearing bracket will be required for the output shaft. An object of this invention is to provide a simple structural arrangement whereby bearing registers are readily and accurately machined. For this purpose, a unique intermediate bracket plate is provided that fits an intermediate frame register and that provides a concentric cup for the inside bearing of the output shaft. Appropriate concentricity is provided by simultaneously machining the bearing cup at the integral end bracket and the register for the bearing bracket. The bracket plate has a suitable relieved area for the companion pinion whereby bearing bores for the bearing of the pinion shaft bearings are simultaneously machined.

This invention possesses many other advantages and has other objects which may be made more clearly apparent from a consideration of several embodiments of the invention. For this purpose, there are shown a few forms in the drawings accompanying and forming part of the present specification, and which drawings are true scale. These forms will be described now in detail, illustrating the general principles of the invention; but it is to be understood that this detailed description is not to be taken in a limiting sense, since the scope of the invention is best defined by the appended claims.

BRIEF DESCRIPTION OF THE DRAWINGS

FIG. 3 is a transverse sectional view taken along a plane corresponding to line 3—3 of FIG. 1.

FIG. 4 is an enlarged fragmentary revolved sectional view taken along the planes indicated by line 4—4 of FIG. 3.

FIG. 5 is a fragmentary sectional view similar to FIG. 1 but illustrating the motor drive unit of FIG. 1 and a single stage gear reduction unit assembled together.

FIG. 6 is a diagrammatic view illustrating the assembly capabilities of a typical gear reduction unit with respect to various drive units.

FIG. 7 is a fragmentary sectional view similar to FIGS. 1 and 5 but illustrating a variable ratio transmission mechanism as the drive unit and the two-stage gear reduction unit.

DESCRIPTION OF THE PREFERRED EMBODIMENTS

Figure 1:
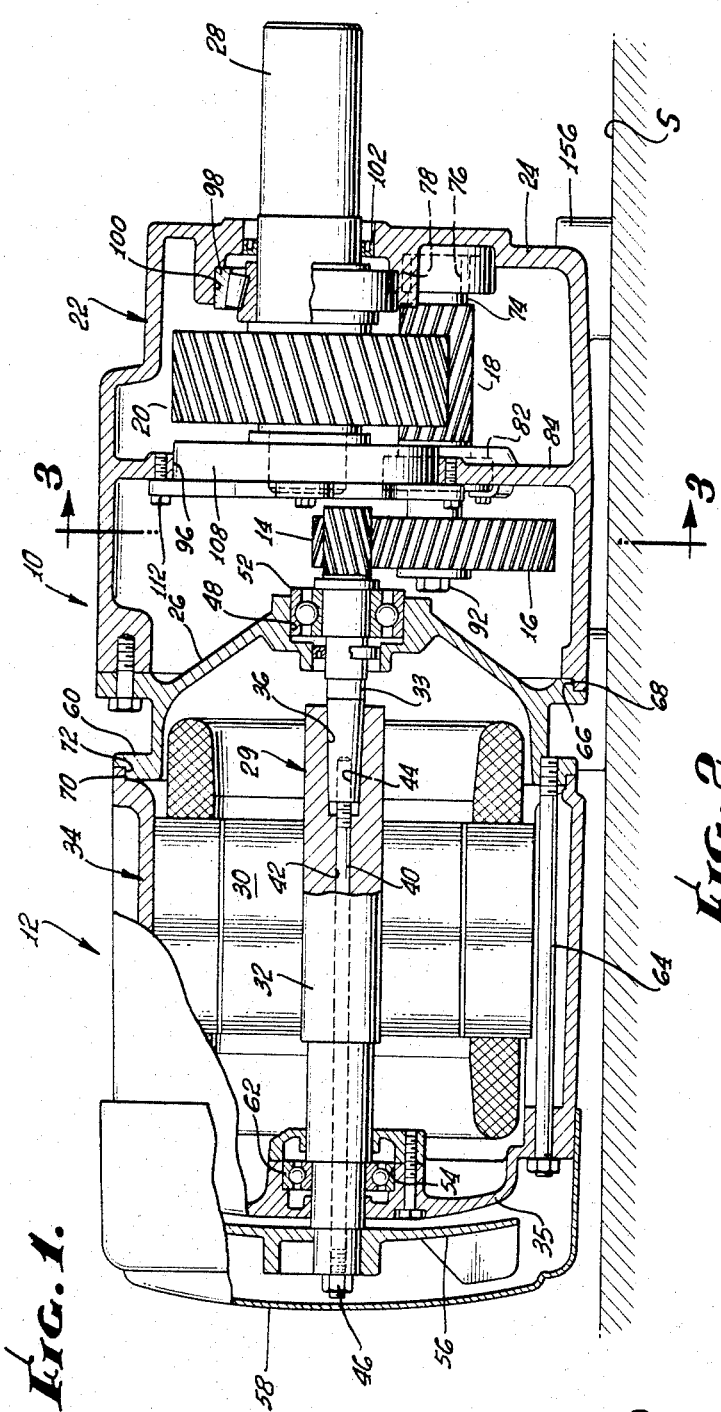
FIGURE 1 is an axial sectional view of a power mechanism including a motor drive unit and a two-stage gear reduction unit assembled together.

The power mechanism shown in FIG. 1 comprises a gear reduction module 10 and a motor module 12 assembled together as a unit. The gear reduction module 10, in this instance, is of the double reduction type, having a train of gears including a first pinion 14 and helical gear 16 and a second pinion 18 and helical gear 20. The gear train is mounted in a cup-like frame 22 having an integrally formed bearing bracket wall 24 at one end and an opening at the other, closed by a bearing bracket 26.

The output shaft 28 carries the final gear 20 of the train and projects through the end wall 24 for connection to a pulley, sprocket, or other load device. The input shaft 29 mounts both the first pinion 14 of the train, as well as the rotor 30 of the motor module 12. The input shaft 29 is made in two rigidly connected axially separable parts 32 and 33. One end of the shaft part 33 carries the pinion 14, while its other end projects outwardly through the bearing bracket 26. The other shaft part 32 extends axially along the frame 34 of the motor module 12. The motor module frame 34, like the frame 24 of the gear reduction module 10, is cup-like having an integrally formed bearing bracket wall 35 at one end and an opening at the other. The frame 34 is secured to the bracket 26 in a manner to be described hereinafter. The shaft part 32 projects through the open end of the motor module frame 34 to connect with the projecting end of the shaft part 33.

Figure 2:
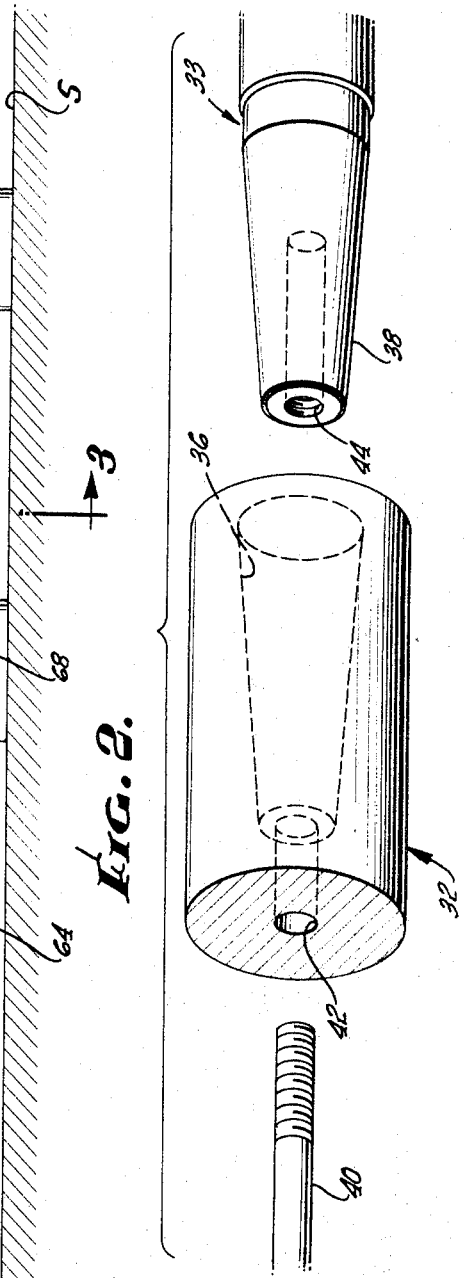
FIG. 2 is a fragmentary pictorial view illustrating the connection of the shaft parts.

In order to rigidly secure the shaft parts 32 and 33, one of the parts 32 provides a conical socket 36 (see also FIG. 2) the taper of which corresponds generally to the taper of a conical projection 38 of the companion shaft part 33. The taper measured as the angle between opposite sides of the part is preferably of the order of 7½°. The socket 36 and projection 38 are firmly drawn and wedged together by a long draw member 40. In this instance, the member 40 is a stud that extends through a bore 42 in the shaft part 32 with one of its threaded ends projecting into the bottom of the socket 36 where it engages a tapped hole 44 in the end of the conical projection 38. The other threaded end of the stud is engaged by a nut 46 which reacts against the other end of the shaft part 32. By rotating the nut 46, the parts are firmly drawn together. Since the taper is slight, a substantial wedging pressure may be developed. Moreover, an extended area of mutual engagement is provided to hold the parts precisely concentric. In order to separate the parts, hydraulic fluid may be injected into the bottom of the socket 36 via a suitable fitting (not shown). Instead of the stud 40 and nut 46, a screw could be provided.

Only two bearings are provided for the shaft 29. Thus the shaft part 33 projects through a bearing cup 48 formed on the inside of the bearing bracket 26. A suitable bearing 52 is accommodated in the cup 48 for the right-hand end of the shaft 29. The shaft part 32 has its end projecting through a bearing cup 54 formed in the integral end wall 35 of the motor module frame 34 to provide access for the draw screwhead 46. The projecting end of the shaft part 32 carries a fan 56 for inducing a current of air along the frame 34. A cover 58 fits over the end of the frame 34. The left-hand end of the shaft 29 is supported by a suitable bearing 62 accommodated in the cup 54. The shaft 29 is thus supported at opposite ends by a pair of bearings 52 and 62. Prior to assembly of the modules 10 and 12, the shaft parts 32 and 33 form components of the motor drive module 12 and the gear reduction module 10. Before such assembly, neither the shaft part 32 nor the shaft part 33 is self-supported. Only when the shaft parts are rigidly connected are they adequately supported.

The motor module frame is secured to an adapter flange 60 formed on the bearing bracket 26, as by the aid of a plurality of screws 64. Concentricity between the bearings 52 and 62 is ensured by conventional register means. Thus the gear reduction frame 22 has at its open end a register 66 extending circularly about the designed position of the shaft axis. The bearing bracket 26 has a circularly extending register 68 fitting the register 66. The bearing cup 48 is machined to be concentric with the register 68. The adapter flange 60 has a register 70 extending circularly about the axis for cooperation with a register 72 formed at the open end of the motor frame 34. The register 72 is machined to be concentric with the cup 54 for the bearing 62.

The helical gear 16 and the pinion 18 are secured to a common countershaft 74. The right-hand end of the shaft 74 is supported by a bearing 76 accommodated in a bearing bore 78 machined on the inside of an integral end bracket or wall 24 of the frame 22. That portion of the countershaft 74 accommodates the gear 16 and the pinion 18, and is supported by a bearing 82 (see also FIG. 4). The bearing 82 is mounted in an apertured partition wall 84 secured to the frame 22. A bore 86 (FIGS. 3 and 4) is machined in the wall 84 concentrically with the bore 78 for installation of the bearing 82. The bearing is held in the bore 86 by the aid of a pair of clamp bars 88 and 90 detachably secured to the partition wall 84 on opposite sides of the bore 86. The end of the countershaft 74 (FIG. 4) together with the pinion 18, and the bearing 76, may be freely passed through a large aperture 91 to seat at the bottom of the bore 86. A screw 92 (FIG. 1) secures the helical gear 16 to the end of the countershaft.

The output helical gear 20 is positioned between the end wall 24 and the partition wall 84 to engage the pinion 18. Access is provided by an enlarged aperture 96 (see also FIGS. 3 and 4) in the partition 84.

The aperture 96 necessarily intersects the bore 86 for the bearing 82 (FIG. 3), since the aperture 96 must be large enough to pass the helical gear 20 and the bore 86 must be large enough to pass the pinion 18, the axes of these gear elements being located so as to provide the proper meshing. Accordingly, the bore 86 extends for less than 360°; yet it extends substantially more than 180° to provide adequate support.

The output shaft 28 is supported on opposite sides of the helical gear by bearings. One bearing 98 is accommodated in a cup 100 formed in the end wall 24 of the frame 92. This bearing 98 is readily inserted through the partition aperture 96. A dust seal 102 is provided about the shaft 28. The inner end of the output shaft 28 is supported by a bearing 104 (FIG. 4) accommodated in a bore 106 formed on the inside of a bracket plate 108 (see also FIG. 3). The plate 108 is attached to the partition wall 84 about the aperture 96. To ensure appropriate concentricity, the aperture 96 is formed as an interrupted circular register concentric with the bore 100, and the bracket plate 108 has a corresponding interrupted circular register 110 fitting the register 96. The bearing bore 106 is formed concentrically with the register 110. Screws 112 (FIG. 3) lock the bracket plate 108 in position.

The bracket plate 108 has a notch or cutout portion 114 (FIG. 3) to clear the bearing 82.

In the form of the invention shown in FIG. 5, the motor drive module 12 is provided as before. In this instance, however, the gear reduction unit 120 is a single stage unit incorporating a pinion gear 122 and a helical gear 124. The pinion 122, like the pinion 14 of the previous form, is supported at the end of a shaft 126. The shaft 126 comprises, in this instance, two parts 32 and 128. The part 128 is similar to the part 33 of the previous form. The right-hand end of the shaft 126 or part 128 is supported by a bearing 130 carried on an integral wall 132 of the frame 134 of the gear reduction module 120. The frame 134 provides an integral adapter flange 136 providing a register 138 of precisely the same size as the register 70 of the previous form. Accordingly, the register 72 of the motor frame 34 fits the frame 134 as in the previous form.

The bearing 130 is accommodated in a bearing bore 140 that opens in the direction of the motor unit 12. A retainer 142 holds seals 143 in position.

The helical gear 124 is supported by a pair of bearings 144 and 146. The bearing 144 is accommodated in a bore 148 formed on the inside of the wall 132 beneath the bore 140. The bore 148 is machined to be concentric with a circular register or opening 150 cut in the frame 134. A bearing bracket 152 has a register 154 fitting the opening 150. The helical gear 124 and the inner bearing 144 are readily inserted through the aperture 150.

The motor module 12 can cooperate with any number of gear reduction units, providing those gear reduction units incorporate as a component a shaft part like the shaft part 34 (FIG. 1) or the shaft part 128 (FIG. 5), and providing, further, that the gear reduction unit incorporates an adapter flange, either an integral or nonintegral part, designed appropriately to register with the frame of the motor module.

Proper connection of input shaft parts does not depend upon the diameter of the shaft parts but, instead, upon corresponding taper of the fitting parts and proper axial positioning. In the present instance, the motor module is designed to be suspended from the transmission module, the latter being provided with feet 156 (FIG. 1) for attachment to a support S.

Just as the motor unit 12 is cooperable with a number of gear reduction units, so also any one gear reduction unit A (FIG. 6) is cooperable with a variety of drive units B, C and D. Thus, the gear reduction unit A may cooperate with a motor B having a small power rating or a motor C having a larger power rating or a variable ratio mechanism D. The variable ratio mechanism may itself cooperate with either motor B or C. The unit A is thus provided with its register 160 of such size and so located as to cooperate with any one of the registers 162, 164 or 166 of the drive units B, C and D.

In FIG. 7, the gear reduction unit A is assembled with the variable ratio mechanism D to form a power unit. The mechanism D, as shown in FIG. 7, includes known elements, such as a variable diameter pulley 168 driven by a motor 170, a variable diameter pulley 172, and a belt 174 connecting the pulleys 168 and 172. The pulley 172 is mounted on a composite shaft 176, only one end of which is supported by the mechanism D. The composite shaft 176 includes parts F and G corresponding to the parts 33 and 32 of the form shown in FIG. 1. The frame 180 of the mechanism D has a large access opening 182 extending about the axis of the shaft 176, as well as an end bracket 184 on the opposite side. The bracket 184 mounts a bearing H for one end of the shaft part 176, and the transmission module A carries a bearing F for the other end.

Registers 160 and 166 determine proper concentricity of the bearings F and H. A draw screw J extending through in the shaft part G, as in the previous forms, serves to wedge the parts together.

We claim:

1. In combination: a composite shaft comprising a pair of shaft parts; one of said shaft parts having a conical projection at one end; the other of said shaft parts having a conical socket at one end having a taper corresponding to that of said projection; one of said shaft parts having a through bore; a bearing surrounding said one of said shaft parts and supporting said one of said shaft parts at a place intermediate the ends of said bore; a bearing for the other shaft part spaced from said one shaft part; and means extending through said bore for drawing said socket and projection together.

2. The combination as set forth in claim 1 in which the tapered socket and said tapered projection are substantially conical.

3. The combination as set forth in claim 1 in which the taper of said socket and said projection is of the order of a 7½° included angle to provide a substantial wedging pressure therebetween as well as an extended axial length of mutual engagement therebetween.

4. The combination as set forth in claim 1 together with casing parts for the respective shaft parts; said bearing being carried by the respective casing parts; and means detachably joining the casing parts together in registered relationship to achieve alignment of the bearings for said shaft parts; said conical projection and said conical socket being located between and axially spaced from both of the bearings when the casing parts are connected.

5. In a power mechanism: a drive module a transmission module; said drive module having a frame open at one end and having a bearing wall at the other; said transmission module having a frame open at one end and having a bearing wall at the other; a pair of bearings respectively carried by the bearing walls of said frames; said frames having register means for determining concentricity between said bearings; means detachably securing said frames together at their open ends; a composite shaft having separate drive module and transmission module components; and means forming a separable rigid coupling between said shaft components independently of the diameter of said shaft components, including a socket formed on one of said shaft components, a projection formed on the other of said shaft components and means operable by manipulation at the end of one of the shaft components for securing said coupling against axial separation; said socket and projection being located between and axially spaced from said bearings.

6. The combination as set forth in claim 5 in which said socket and projection are formed as mating parts located entirely within the shaft components.

7. The combination as set forth in claim 5 in which said socket and projection are formed as mating conical parts; one of said shaft components having a through bore extending to said mating components; and draw screw means extending through said bore and operable to urge said socket and projection together.

8. In a power mechanism: a drive module; a transmission module; said drive module having a frame; said transmission module having a frame; means detachably securing said frames together; a composite shaft interconnecting the drive module and the transmission module, said composite shaft having a drive module component and a transmission module component; means forming an axially separable rigid coupling between said shaft components, including a tapered socket formed on one of said shaft components and a correspondingly tapered projection formed on the other of said shaft components; one of said shaft components having a through bore accessible through the frame of the corresponding module remote from said coupling; means extending through said bore and engaging the other shaft component for drawing said socket and projection together independently of the diameter of said shaft components; a pair of bearings for said composite shaft respectively carried by the frames of said modules; and register means between said frames for determining concentricity of said bearings; said socket and projection being located between and axially spaced from said bearings.

9. The combination as set forth in claim 8 in which said tapered socket and said tapered projection form the sole means for transmission of torque between said components.

10. In a power mechanism: a transmission module having a frame, said frame having an integrally formed wall at one end and an opening at their other; said end wall having a first interiorly opening bearing bore; an output shaft extending through said first bearing bore; a first bearing mounted in said first bore and supporting one end of said shaft; said end wall having a second intesaid output shaft; said end wall having a second interiorly opening bearing bore; a countershaft; a second bearing mounted in said second bearing bore and supporting one end of said countershaft; a first pinion gear mounted on said countershaft and engaging said first helical gear; said frame having an intermediate wall spaced from said end wall; said intermediate wall having a bearing bore; a third bearing mounted in the bearing bore of said intermediate wall and supporting the countershaft on the opposite side of said first pinion; said intermediate wall having a circularly extending aperture concentric with the said first bearing bore; said aperture intersecting said bearing bore of said aperture and having a cutout portion to clear said third bearing; said bracket plate having an interior bearing bore; a bearing in said bracket plate bore and supporting said output shaft on the opposite side of said first helical gear; the other end of said countershaft extending through said bearing bore of said intermediate wall; a second helical gear mounted on said other end of said countershaft; a bearing bracket mounted adjacent the open end of said frame; an input shaft extending through said bearing bracket; a bearing mounted on said bearing bracket and supporting said input shaft; and a second pinion mounted on said input shaft on the inside of said bearing bracket and engaging said second helical gear; said aperture bieng of a size larger than said first helical gear for removal thereof through the intermediate wall and the opening of said frame; said bearing bore of said intermediate wall being of a size larger than said second bearing and said first pinion for removal thereof through said intermediate wall.

11. In a power mechanism: a variable ratio transmission module having a frame; said frame having an opening; a first shaft part; a variable diameter pulley member support on said first shaft part; bearing means supporting one end of said first shaft part on said frame opposite said other end of said first shaft part being accessible at said frame opening; a transmission module having a frame provided with an opening at one end; said transmission module having a second shaft part; bearing means supporting one end of said second shaft part on the frame of said transmission module opposite said opening; the other end of said other shaft part being accessible at the opening of said transmission module frame; means detachably securing said frames together at their openings with the axes of said bearing means aligned; said shaft parts at other ends having means forming a rigid coupling between the shaft parts, including a socket formed on one of said shaft parts, a projection formed on the other of said shaft parts and means operable by manipulation of at one of said ends of said shaft parts for securing said shaft parts against axial separation.

References Cited

UNITED STATES PATENTS

| | | |
|---|---|---|
| 1,142,357 | 6/1915 | Norling. |
| 1,774,050 | 8/1930 | Brown _____ 287—53 X |
| 2,030,260 | 2/1936 | Lewis. |
| 2,173,339 | 9/1939 | Myers. |
| 2,646,297 | 7/1953 | Chrichton et al. _____ 287—53 |
| 2,874,985 | 2/1959 | March _____ 287—53 |
| 3,143,366 | 8/1964 | Nichols. |
| 3,234,808 | 2/1966 | Nelson. |

DONLEY J. STOCKING, *Primary Examiner.*

LEONARD H. GERIN, *Assistant Examiner.*

U.S. Cl. X.R.

74—606; 287—53